United States Patent
Császár et al.

(10) Patent No.: US 9,094,349 B2
(45) Date of Patent: *Jul. 28, 2015

(54) AGGREGATED RESOURCE RESERVATION FOR DATA FLOWS

(71) Applicant: TELEFONAKTIEBOLAGET L M ERICSSON (PUBL), Stockholm (SE)

(72) Inventors: András Császár, Telki (HU); Attila Takács, Budapest (HU); Attila Báder, Paty (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/082,993

(22) Filed: Nov. 18, 2013

(65) Prior Publication Data
US 2014/0064076 A1   Mar. 6, 2014

Related U.S. Application Data

(63) Continuation of application No. 12/064,127, filed as application No. PCT/EP2005/009094 on Aug. 23, 2005, now Pat. No. 8,681,624.

(51) Int. Cl.
*G06F 11/00*   (2006.01)
*G01R 31/08*   (2006.01)
(Continued)

(52) U.S. Cl.
CPC ............ *H04L 47/72* (2013.01); *H04L 12/5695* (2013.01); *H04L 47/724* (2013.01); *H04L 47/823* (2013.01)

(58) Field of Classification Search
CPC ...................................... H04L 47/72
USPC ........................................... 370/235
See application file for complete search history.

(56) References Cited

U.S. PATENT DOCUMENTS 6,661,806 B1   12/2003   Eriksson et al.
7,269,657 B1   9/2007   Alexander et al.
(Continued)

FOREIGN PATENT DOCUMENTS

EP   1 467 588 A   10/2004
JP   H08-256157 A1   10/1996
(Continued)

OTHER PUBLICATIONS

White, P P: "RSVP and Integrated Services in the Internet: A Tutorial" IEEE Communications Magazine, IEEE Service Center, New York, NY, US, vol. 35, No. 5, May 1997, pp. 100-106, XP000657115 ISSN: 0163-6804 p. 100, left-handed column, line 33-p. 101, left hand column, line 23 p. 102, left-hand column, line 27-right hand column, line 51 p. 103, left hand column, line 45-p. 104, left-hand column, line 18 p. 104, right-hand column,line 40-p. 105, left-hand column, line 21 figures 2,3,5,6.

*Primary Examiner* — Shaq Taha (57) ABSTRACT

A network node for reserving resources for data flows in a communication network. The node detects a request for resource reservation for a new data flow and computes an admission test count based on descriptors of the new data flow and reservation counts, which represent reservation functions of descriptors of previously admitted data flows and which specify resources of the admitted data flows. The new data flow is admitted if the admission test count is smaller than a maximum allowable count. The reservation counts are then updated based on the descriptors of the new data flow. A plurality of admission formulas may thus be used to maintain aggregated reservation counts for data flows, the number of counts being independent from the number of flows.

18 Claims, 5 Drawing Sheets

(51) Int. Cl.
*H04L 12/911* (2013.01)
*H04L 12/54* (2013.01)
*H04L 12/913* (2013.01)

(56) References Cited

U.S. PATENT DOCUMENTS

| | | |
|---|---|---|
| 7,274,662 B1 | 9/2007 | Kalmanek et al. |
| 2001/0025310 A1 | 9/2001 | Krishnamurthy et al. |
| 2002/0059432 A1 | 5/2002 | Masuda et al. |
| 2003/0161268 A1 | 8/2003 | Larsson et al. |
| 2003/0202469 A1 | 10/2003 | Cain |
| 2004/0081092 A1 | 4/2004 | Rhee et al. |
| 2004/0242235 A1* | 12/2004 | Witana .................. 455/452.2 |
| 2006/0002297 A1 | 1/2006 | Sand et al. |
| 2006/0077962 A1 | 4/2006 | Wu et al. |
| 2006/0209726 A1 | 9/2006 | Kawasumi |

FOREIGN PATENT DOCUMENTS

| | | |
|---|---|---|
| WO | WO 98/37730 A | 8/1998 |
| WO | WO 02/075554 A | 9/2002 |

\* cited by examiner

AGGREGATED RESOURCE RESERVATION FOR DATA FLOWS

RELATED APPLICATIONS

This application is a continuation of co-pending U.S. patent application Ser. No. 12/064,127 filed on Jun. 30, 2008, which is a 371 of International Application No. PCT/EP2005/009094, filed Aug. 23, 2005, the disclosures of which are fully incorporated herein by reference.

FIELD OF THE INVENTION

The present invention relates to resource reservation for data flows in a communication network.

BACKGROUND OF THE INVENTION

Communication applications in today's business and private environments are ubiquitous and offer a wide variety of different services, such as e-mail services, web browsing, telephony and video conferencing. With the different communication applications different resource requirements emerge. For example an e-mail application requires a transmission of data from a sender to a recipient, but generally strict time constrains are not imposed on the data transmission. However, a voice or video communication application requires a certain minimum data throughput and is time sensitive, i.e., delays in the transmission of information lead for example to voice or video dropouts and corresponding inconvenience.

Further, while traditional circuit switched networks generally provide a dedicated connection for a certain application, such as a telephone conversation or video conference, packet switched or connectionless networks do not provide such dedicated communication line, but may for example route a sequence of data packets from a source to a destination, possibly over varying paths. A delay of one or more of these packets during transmission will cause problems at the destination, as the application has to wait for the delayed data packet before continuing the service.

Obviously such characteristics of networks are undesirable, raising the demand for mechanisms to assure certain minimum qualities of a communication in such networks. Quality of service (QoS) is a term referring to required characteristics of a communication application. For example a quality of service characteristic of a video conference could be constituted by a certain minimum data throughput and a certain maximum delay of data transmissions. In order to meet quality of service requirements, a communication application may signal corresponding information prior to establishing a communication link between the communicating entities. The network in response thereto establishes, if possible, a corresponding communication link maintaining the requirements specified.

Communication resources may be reserved for a communication application upon initialising the communication or a data flow associated with the application. This reservation may address the quality of service requirements stated by the communication application. The resources may be reserved once by a central authority assigning the required resources to the communication link or data flow, or the communication resources may be assigned to the communication dynamically on a distributed bases at each network node of the communication network transmitting or relaying the communication link or data flow. A new data flow can only be admitted, if sufficient communication resources are available.

It is therefore required in this case that each network node maintains information on previously allocated communication resources.

However, with a potentially large number of different data flows each node must store a correspondingly large amount of data of the requirements for each flow.

SUMMARY OF THE INVENTION

It is an object of the invention to provide for reserving resources for data flows in a communication network at reduced computational requirements for multiple different service requirements.

This object of the invention is solved by the subject-matter of the independent claims. Advantageous embodiments are disclosed in dependent claims.

According to an example a method of reserving resources for data flows in a communication network comprises detecting a request for resource reservation for a new data flow including a plurality of descriptors specifying requested resources; computing an admission test count based on the plurality of descriptors of the new data flow and reservation counts, the reservation counts representing reservation functions of a plurality of descriptors of a plurality of admitted data flows specifying resources of admitted data flows; admitting the new data flow, if the admission test count is smaller than a maximum admission count for the plurality traffic descriptors; and updating the reservation counts based on the descriptors of the new data flow, if the new data flow is admitted.

Accordingly, as the reservation counts represent resources for a plurality of admitted data flows with respect to a plurality of descriptors such as quality of service requirements, a node may handle a potentially large number of flows without individually storing the descriptors of each flow. If the flow is admitted only the reservation counts need to be updated to also reflect the resources for the new flow.

According to an example, the reservation function is constituted by a sum function or a product function, a sum function being constituted by a sum of functions having as variables the descriptors of the data flows and a product function being constituted by a product of functions having as variables the descriptors of the data flows. Thus, a reservation count can be updated based on the descriptors of the new flow by an add operation or product operation of the existing reservation count and the function of the descriptors of the new flow.

According to another example, updating the admission test count includes adding the sum function of the descriptors of the new data flow to the reservation count or multiplying the reservation count with the product function of the descriptors of the new flow. The corresponding updated reservation counts then advantageously reflect all admitted data flows including the new flow.

According to another example, each reservation count can be updated if a release instruction for one of the admitted flows is received, based on the corresponding descriptors. Releasing a flow may include subtracting the sum function of the descriptors of the released flow from the reservation counts or dividing the reservation counts by the product function of the descriptors of the released data flow. Accordingly, a released flow can be reflected in the reservation counts by a subtraction operation or division operation, avoiding the need to maintain the descriptors of all flows which potentially be released.

Still further, according to another example, computing each reservation count is based on flows admitted of refreshed during a refresh window having a predetermined duration. A flow may be released unless a refresh request associated with the flow is received during the refresh window or if an explicit release instruction is received. Accordingly, by making use of the refresh window and by releasing all flows not refreshed within the refresh window or explicitly released, the reservation counts can keep track of all flows admitted and not released during the duration of the refresh window.

According to an advantageous embodiment, each reservation count may comprise a plurality of sub-counts, each sub-count being based on flows admitted or refreshed during adjacent sub-portions of the refresh window, a sub-portion corresponding to a unit in time for advancing the refresh window. Upon advancing the refresh window by one unit in time a new sub-count can be generated and the oldest of the sub-counts is removed. Accordingly, upon each advancing of the sliding window by one unit in time an oldest sub-count can be removed and a new sub-count be computed based on all admitted new flows, refreshed and released flows. The new reservation sub-count then reflects all new, refreshed and released flows, so that the oldest reservation count is obsolete. Accordingly, it is sufficient to maintain a plurality of reservation sub-counts, one for each reservation count for each sub-portion or unit in time of the refresh window, further reducing computational complexity.

According to another example, the admission test vector is computed based on a sum of a measured bandwidth, a peak rate of the new flow and the sum of degrades of the new flow in the admitted flows.

A program may be provided having instructions adapted to carry out the above operations and a computer readable medium may comprise the program. A computer program product may comprise the computer readable medium.

According to another example, a network node for reserving resources for data flow in a communication network may be provided, comprising a resource manager for detecting a request for resource reservation for a new data flow including a plurality of descriptors specifying requested resources, and for computing an admission test count based on a plurality of descriptors of the new flow and reservation counts, the reservation counts representing reservation functions of a plurality of descriptors of a plurality of admitted data flows and specifying resources allocated for admitted data flows, a flow control unit for admitting new data flow, if the admission test count is smaller than a maximum admission count for the plurality of traffic descriptors, and wherein the resource manager is adapted to update the admission test counts based on the descriptors of the new flow, if the new flow is admitted.

DETAILED DESCRIPTION OF THE PREFERRED EMBODIMENTS

Figure 1:
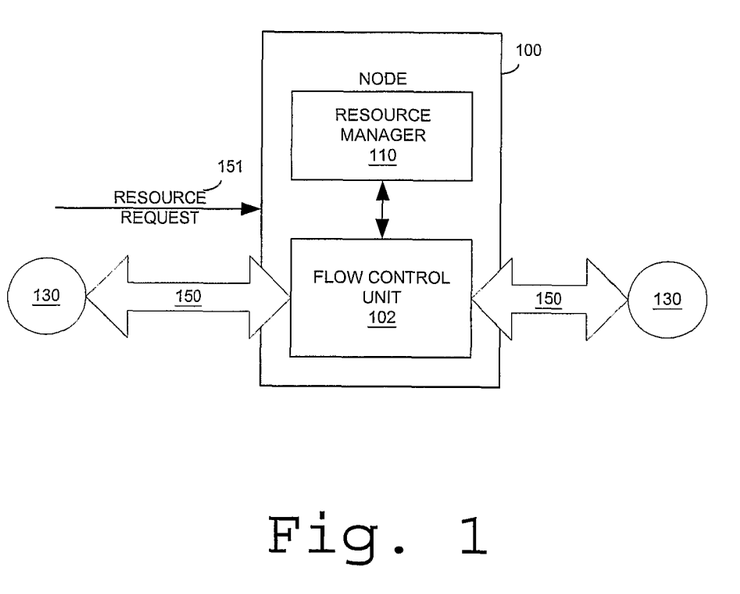
FIG. 1 illustrates elements of a communication system for resource reservation according to an embodiment of the invention.

FIG. 1 illustrates elements of a communication network for resource reservation for data flows according to an embodiment of the invention.

FIG. 1 illustrates a communication node of a network for relaying or transmitting data flows between communicating entities. The network node, generally denoted 100, is provided with a resource manager 110 and a flow control unit 120. The flow control unit provides for communication resources for data flows and may admit or deny a new data flow. The resource manager keeps track of the resources available at the network node for relaying or transmitting data flows. The network node 100 is connected to neighbouring network nodes, denoted 130, via communication links 150. Each of the network nodes 130 may have a similar constitution as the network node 100, i.e., each node may be authorized to keep track of available resources and to admit or deny a new data flow. The network nodes 100, 130 may form part of a larger network, constituted by a large number of network nodes and communicating entities.

The resource reservation mechanism at the network node 100 becomes active, if a resource request is received, as schematically illustrated at 151. The resource request may be issued by a communicating entity, such as a computing device, a telephone, a video conferencing equipment and similar, and may be either received directly from the communicating entity or via the network nodes 130 and over the communication links 150 connecting the network nodes 130 and the network node 100.

The resource manager 110 is provided for detecting the resource request 151 for resource reservation for a new data flow asking to be admitted at the network node 100. The resource request at least includes a plurality of descriptors specifying requested resources, such as a minimum bandwidth requirement, a mean bandwidth requirement, a maximum time delay for data transmission, a peak rate, a mean rate, or any other quality of service requirement. In addition thereto the resource request may also include an identity of the requesting entity and the data flow, an authorization code for requesting certain resources, security codes and similar.

When resource request is detected, the resource manager 110 computes an admission test count based on the plurality of descriptors of the new flow and a constant number of reservation counts, for example previously computed and maintained in a storage unit. The reservation counts represent the results of computing reservation functions having as variables a plurality of descriptors of a plurality of admitted data flows and specifying resources of the admitted data flows. The reservation counts thus reflect the resource descriptors of the individual flows in an aggregated manner, i.e. without explicitly denoting the resource descriptors of the individual flows. As the resource descriptors are not stored individually for all flows, the number of variables, reservation counts, becomes independent of the number of flows and the system becomes easily scalable.

More precisely, upon detecting a resource request the resource manager extracts from the resource request the descriptors of the flow requested to be admitted, and computes or obtains, such as from the storage unit, the reservation counts representing reservation functions of corresponding descriptors of already admitted data flows and specifying the allocated resources.

A plurality of reservation functions may be present, each associated with a reservation count and specifying mathematical operations, such as sum, product, square root, etc. operations, to be carried out on the resource descriptors or rather descriptor values of the admitted data flows.

In addition thereto the reservation function is executed also with the descriptors of the new data flow as variables and then a corresponding admission test count is obtained based on the result of the computation of the reservation function on the descriptor values of the new data flow and the reservation counts. The admission test count may be a single value or a collection of different values in a vector and represents the overall required resources, if the new flow were admitted.

According to an example, a reservation count may represent a required bandwidth for all admitted flows, an estimated peak rate for all admitted flows, a maximum guaranteed time delay for transmitting data, and similar. The admission test count would then reflect the overall bandwidth including the new data flow, the maximum peak rate including the new data flow and a maximum guaranteed time delay for data transmission including the new data flow.

After computing the admission test count the resource manager decides that the new data flow is to be admitted, if the admission test count does not exceed a maximum admission count for the plurality of traffic descriptors, wherein the maximum admission count for example constitutes an admission function of maximum reservation counts.

For example, the maximum admission counts could be calculated on the basis of threshold limits for individual resources offered by the network node, such as a maximum available bandwidth, a maximum allowable peak rate, etc.

According to an example, the maximum admission count represents a single value, such as a weighted calculation based on each of maximum allowable descriptors, and similarly the admission test count may be constituted by a single value reflecting for example a weighted calculation based on the plurality of reservation counts and the descriptors of the new flow. In this case a flow will be admitted, if the value of the admission test count does not exceed the maximum admission count.

Alternatively, the maximum admission count comprises a plurality of values corresponding to individual maximum resource descriptors and individual comparisons may be carried out with corresponding elements of the admission test count. A flow could be admitted, if none of the elements of the admission test count exceeds the corresponding maximum reservation counts of the maximum admission count. If the admission test count and the maximum admission count are constituted by a plurality of values, an admission of a new flow may also take place according to certain rules, such as allowing one of the components to exceed a corresponding maximum component, etc.

If the new data flow is admitted, the reservation counts are updated based on the descriptors of the new data flow such that after the update operation the reservation counts reflect all reserved resources for all admitted data flows, including the new data flow. If the new flow is not admitted, the resource manager does not update the reservation counts, in which case the reservation counts remain reflecting the previously admitted data flows.

The flow control unit 120 executes after the admission check the steps for admitting or denying the data flow, including reserving the corresponding resources and subsequent transmission of data pertaining to the admitted data flow.

The network node 100 is one of a plurality of nodes of a communication network, such as a wireless communication network or a wire bound or mixed communication network. The network node may for example be a router of a network, such as in an Internet based network, a base station, or any network node interfacing neighbouring communication networks. The communication links in the network are illustrated at 150 and may be dedicated communication links, connectionless communication links or wireless links. According to one example the communication network is at least partially constituted by a packet switched network, such as an IP based network, e.g. the Internet, with a sequence of packets constituting a data flow admitted or checked for admission.

In operation, each network node may be responsible for managing its own resources, i.e., to admit data flows or deny data flows. Accordingly, a data flow can only be routed from a source to a destination, if all network nodes along the path admit the data flow. The admission flow procedure may be carried out dynamically, such as when a communication application takes steps to set up a communication session and requests routing of a corresponding data flow.

According to an example the resource manager 110 and the flow control unit 120 are constituted by processing elements of the network node, such as corresponding hardware and/or software. Alternatively or in addition thereto, external components may be made use of, such as external memories for storing reservation counts, external processing elements for computing admission test counts, etc. The resource manager and the flow control unit may be constituted by separate dedicated elements, communicating with one another via internal busses, etc. Alternatively, the resource manager and flow control unit may be constituted by logic entities realized at least partially by corresponding software routines executed on a processing unit.

In accordance with the above embodiment, as a constant number of reservation counts aggregate resources for a plurality of admitted data flows with respect to a plurality of descriptors such as quality of service requirements, such as peak bandwidth rate, average rate, burst size, etc., a node may handle a potentially large number of flows without individually storing the descriptors of each flow. If the flow is admitted only the reservation counts need to be updated to also reflect the resources for the new flow. An admission control formula can therefore be maintained in a reduced state environment, with the reservation counts aggregating the admitted resources.

Figure 2:
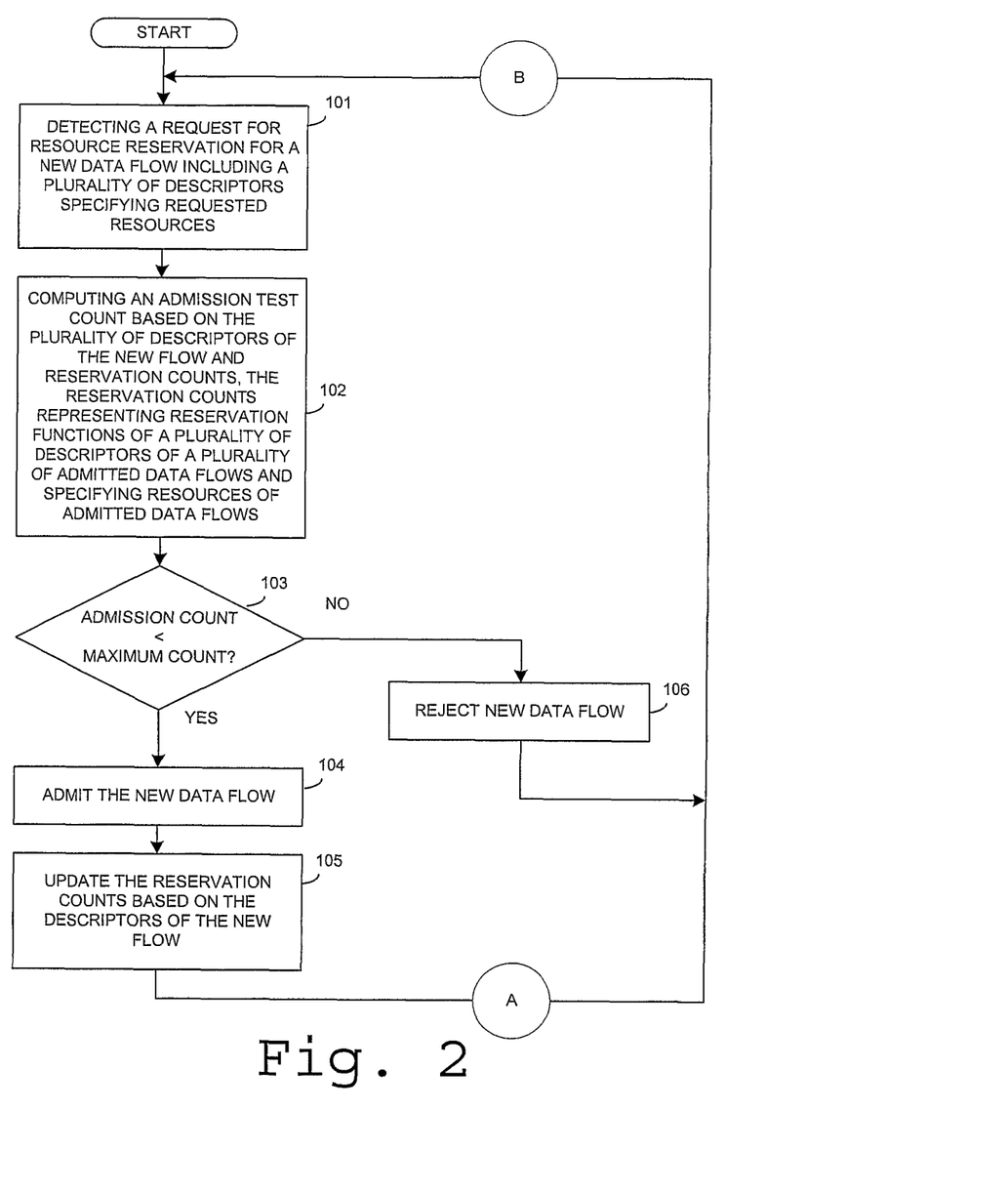
FIG. 2 illustrates reservations of a method for reserving resources for data flows in a communication network according to an embodiment of the invention.

In the following a further embodiment of the invention will be described with regard to FIG. 2. FIG. 2 illustrates operations of a method for resource reservation in a communication network.

In a first operation 201 a request for resource reservation for a new data flow is detected, the request for resource reservation including a plurality of resource descriptors specifying requested communication resources at a network node. In one example the request is received at each network node along a path between two communicating entities. The request for resource reservation may be transmitted in accordance with a communication protocol for message exchange in a communication network, and may for example be forwarded from one network node to a subsequent network node along a desired or suitable communication path from a communication source to a communication destination. The request for resource reservation requests admission of a new data flow at the network node.

The data flow may be any form of a data for transmission from the communication source to the communication destination. For example, the data flow may be a continuous data stream or a sequence of data packets carrying communication data.

The request for resource reservation may request admission of the new data flow unidirectionally, i.e., from the communication source to the communication destination, or may request for admission of the data flow bidirectionally, from the communication source to the communication destination and on the return path from the communication destination to the communication source.

The application data or payload information transmitted with the data flow may stem from any kind of communication, i.e. may include e-mail data, voice data, data of a video conference, data pertaining to an exchange between computing devices, etc.

Preferably, the descriptors specifying requested resources specify minimum required resources for satisfying the requirements of the underlying application. For example, the descriptors may specify a required bandwidth, a medium required bandwidth, a peak rate, a mean rate and a maximum allowable transmission delay and similar. Moreover, the descriptors may specify a leaky bucket and a token bucket.

In an operation 202 at the network node an admission test count is computed based on the plurality of descriptors of the new flow received with the request for resource reservation and a plurality of reservation counts. The reservation counts represent reservation functions of a plurality of descriptors of a plurality of admitted data flows and specify the aggregate resources of all admitted data flows. The reservation functions may be constituted for example by sum functions, product functions, or a collection of sum and product functions. A sum function being is constituted by a sum of a reservation function having as variables the descriptors respectively of each of the data flows and a product function being constituted by a product of functions having as variables the descriptors of the data flows.

In general term a sum function has the following form:

$$S_n = \sum_i f_n(\overline{p}_i), \quad (1)$$

and a product function $$P_m = \prod_i g_m(\overline{p}_i) \quad (2)$$

with:

$S_n$ and $P_m$ constituting reservation counts, $\overline{p}_i$ representing the vector of the descriptors of the flow i;

$f_j$ representing a reservation sum function of the sum type reservation count j;

$g_k$ representing a reservation product function of the product type reservation count k;

According to an example the admission test vector is computed based on a sum of a measured bandwidth, a peak rate of a new data flow and the sum of peak rates of the new data flow and the admitted flows.

In this example the Hoeffding-Bounds (HB) are used to make an admission decision. Here, the (n+1)th flow is admitted if:

$$M + p_{new} + \sqrt{\frac{\ln(1/\in)\left(\sum_{i=1}^{n+1}(p_i)^2 + (p_{new})^2\right)}{2}} \leq C, \quad (3)$$

where M is the measured bandwidth, $p_i$ is the signalled peak rate of the ith flow, epsilon is a parameter that controls the degree of risk of the admission control procedure, and C is the link capacity. The formula can be transformed into a form suiting a reduced state environment:

$$G(S_1, M, p_{new}) = M + p_{new} + \sqrt{\frac{\ln(1/\in)(S_1 + p_{new}^2)}{2}} \leq C \quad (4)$$

This example admission control formula requires to maintain $$S_l = \sum_i p_i^2$$

as an aggregated variable.

With the reservation counts being represented by sum functions or product functions of the descriptors of the admitted data flows, it can be kept track of admitted resources without maintaining information on the descriptors of each admitted data flow itself. Rather, the aggregated results of the sum or product function computations of the descriptors of all admitted flows are maintained as reservation counts. Each reservation count therefore may correspond to an amount or extent of resources used at the network node corresponding to the descriptors of all admitted data flows.

Computing the admission test count includes integrating the descriptors of the new data flow into the reservation counts. If the reservation function for computing the reservation count is e.g. a sum function, the reservation function of the descriptors of the new flow can be added to the reservation flow, and if the reservation function is a product function, the product function of the descriptors of the new flow can be multiplied with the corresponding reservation count.

The admission test count then is a function of all reservation counts, including the descriptors of the new data flow.

Generally speaking, the admission test count is in the following form:

$$F\left(\sum_1 f_1(\overline{p}_i); \ldots ; \sum_i f_j(\overline{p}_i); \prod_1 g_1(\overline{p}_i); \ldots ; \sum_i g_k(\overline{p}_i); \overline{p}_{new}; \overline{C}\right) \quad (5)$$

with:

$\overline{p}_i$ represents the vector of the descriptors of the flow i;

$f_j$ represents a reservation sum function of the sum type reservation count j;

$g_k$ represents a reservation product function of the product type reservation count k;

$\overline{p}_{new}$ represents the vector of the descriptors of the new data flow;

$\overline{C}$ represents the vector of pre-configured parameters of the admission test count; and F represents an arbitrary function.

After computing the admission test count in an operation 203 it is determined whether the admission test count does not exceed a maximum admission count. The maximum admission count stands for a maximum allowable resource reservation and is based on maximum values of the resources available at the network node described by the descriptors of the admitted and new data flows. Preferably, the maximum admission count is based on an admission function of maximum reservation counts.

In general terms the maximum admission count is represented as:

$$F'(S_1; S_2; \ldots; S_j; P_1; P_2; \ldots; P_k; \bar{p}_{new}; \overline{C}) \quad (6)$$

with:
$S_j$ representing maximum reservation counts for the sum functions;
$P_k$ representing maximum reservation counts of sum functions; and
F' representing an admission function.

The determination operation 203 may include a comparison of two values, or may include a comparison of multiple values representing the admission count and corresponding values representing the maximum count. The comparison operation may be viewed as a comparison of two vectors, an admission count vector and a maximum count vector. The admission count would be considered not to exceed the maximum admission count, if none of the elements of the admission test count exceed a corresponding value of the maximum admission count. Alternatively, a length of the admission test count vector and a length of the maximum admission count vector could be compared.

If in operation 203 the decision is "NO", i.e., if the admission test count exceeds the maximum admission count, the new data flow is rejected in an operation 206.

If in operation 203 the decision is "YES", i.e., when the admission count does not exceed the maximum admission count, the new data flow is admitted in operation 204. Admitting the new data flow preferably includes allocating the required resources for routing the new data flow in accordance with the resource request. Operation 204 may also include informing the requesting entity and all communication nodes along the communication path of the admission of the data flow.

Further, in an operation 205 the reservation counts are updated based on the descriptors of the new flow. This operation is for reflecting the now allocated resources for the new data flow into the reservation counts. Updating the reservation counts may include storing the elements of the admission test count, i.e., the reservation counts including the descriptors of the new flow as new reservation counts. If the reservation function is a sum function, the corresponding updated reservation count then is the sum of the previous reservation count and the reservation sum function of the descriptors of the new flow. If the reservation function is a product function, the updated reservation count corresponds to the product of the previous reservation count and the reservation product function of the descriptors of the new flow. The update operation may include overwriting a previous reservation count to reflect from now on the updated reservation count for example in an admission operation of a further new data flow.

If the new data flow was rejected, no such updating operation is carried out, and the previously stored or computed reservation counts are maintained as they are.

In the following a further example for an admission control formula will be described.

This example shows the reduced state implementation of the heavy traffic approximation (HTA) theory as described for example in H. G. Perros and K. M. Elsayed: "Call admission control schemes: A review", IEEE Communications Magazine, vol. 34, no. 11, pp. 82-91, November 1996.

According to the heavy traffic approximation theory a new flow is admitted at a node if $$ln\left[\gamma \frac{1}{zK}\right] < ln\varepsilon \quad (7)$$

wherein $$z \approx 1 + \frac{1 - \left(\sum_{i=1}^{n} r_i R_i + r_{new} R_{new}\right)}{\sum_{i=1}^{n} r_i R_i (1-r_i)^2 b_i + r_{new} R_{new}(1-r_{new})^2 b_{new}} \quad (8)$$

with the following pre-configured parameters, i.e. parameters depending on the environment, such as the node, and not the flow itself:
$\gamma$: a constant parameter
K: is the buffer capacity at the node
$\varepsilon$: is the target loss probability
and with the following per-flow signalled descriptors, i.e. descriptors transmitted in association with a flow.
$R_i$: is the peak rate of flow i
$r_i$: is the activity factor of flow i
$b_i$: mean duration of active periods of flow i The above admission control function (8) can be transformed into a reduced state environment, if the following reservation counts are defined:

$$S_1 = \sum_{i=1}^{n} r_i R_i \quad (9)$$

$$S_2 = \sum_{i=1}^{n} r_i R_i (1-r_i)^2 b_i \quad (10)$$

substituting the reservation counts (9) and (10) into the admission control function (8) leads to the reduced state admission control function:

$$z = 1 + \frac{1 - S_1 - r_{new} R_{new}}{S_2 + r_{new} R_{new}(1 - r_{new})^2 b_{new}} \quad (11)$$

If now a new flow wishes to be admitted the following admission test count is computed on the basis of the reservation counts (9) and (10) and the vector of the descriptors of the new flow $\bar{p}_{new}$.

$$ln\left[\gamma \frac{1}{\left\{1 + \frac{1 - S_1 - r_{new} R_{new}}{S_2 + r_{new} R_{new}(1 - r_{new})^2 b_{new}}\right\}^K}\right] < ln\varepsilon \quad (12)$$

The admission test count is compared to the maximum admission count, as described previously, and if it is decided to admit the flow, the reservation counts (9) and (10) are updated as follows:

$$S_1 \leftarrow S_1 + r_{new} R_{new} \quad (13)$$

$$S_2 \leftarrow S_2 + r_{new} R_{new}(1 - r_{new})^2 b_{new} \quad (14)$$

If the flow is not admitted, i.e. if the reservation test count exceeds the maximum admission count, as described previously, the reservation counts (9) and (10) are not updated.

On the other hand, if a flow is released by explicit signalling of the corresponding descriptors, then the reservation counts (9) and (10) are updated as follows:

$$S_1 \leftarrow S_1 - r_{new} R_{new} \quad (15)$$

$$S_2 \leftarrow S_2 - r_{new} R_{new} (1 - r_{new})^2 b_{new} \quad (16)$$

FIG. 2 illustrates the advantages of the inventive method of avoiding storing descriptors of each admitted and new data flow, instead a constant number of reservation counts representing some more product functions of the descriptors of all flows are maintained and suitably updated if new flows are admitted.

In the following a further embodiment of the invention will be described with regard to FIG. 3.

Figure 3:
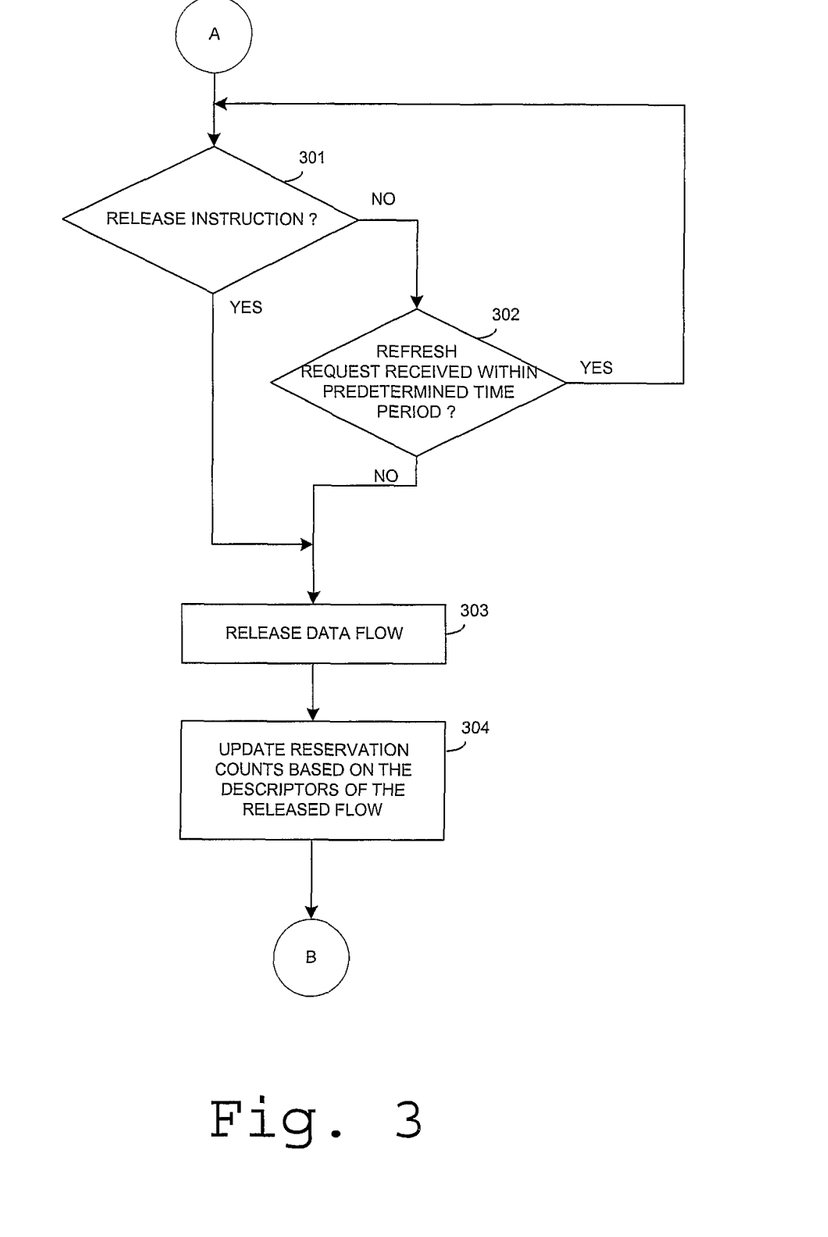
FIG. 3 illustrates operations of a method for resource reservation according to another embodiment of the invention, particularly illustrating releasing a data flow.

FIG. 3 shows operations of a method for resource reservation, particularly illustrating operations in connection with releasing resources of flows previously admitted.

Operations start at an entry point A that for example follow operation 205 of FIG. 2.

As noted with regard to the previous embodiments, reservation counts are maintained, the reservation counts reflecting resources of all admitted flows in an aggregated manner, i.e., the information is not stored with respect to each admitted flow, but in an aggregated manner reflecting all flows collectively. Accordingly, special provision must be made to not only terminate a data flow, but also to remove allocated resources or more precisely resource descriptors of requested resources from the reservation counts for a particular flow that is not any longer maintained.

In a first operation 301 it is determined whether a release instruction in association with a particular flow is received. A release instruction may be transmitted similar to a resource request from the communication source along the path of the admitted data flow, to inform each communication node of the fact that the communication link and associated data flow is not any longer required. Preferably the release instruction includes an indication of the flow or communication link to be released and furthermore includes the descriptors of the resources admitted for the data flow. The descriptors of the admitted resources, i.e., the resources previously requested when transmitting the resource request for admitting the data flow can be used for correspondingly adjusting the reservation counts, as will be outlined further below.

If in operation 301 the decision is "YES", indicating that a release instruction was received, in an operation 303 the corresponding data flow is released, making the correspondingly allocated resources available for further data flows. Releasing the data flow may include terminating an associated communication link such as by the flow control unit 120 shown in FIG. 1.

If in operation 301 the decision is "NO", indicating that a release instruction was not received, in an operation 302 it is determined whether a refresh request is received within a certain predetermined time period. For example, the communication network is designed such that each communication entity requiring maintenance of an admitted flow transmits a refresh request periodically in order to inform each relaying communication node that the communication link or data flow is still required. For example, a communication entity such as a communication application may upon a terminating event such as a killing of the application or a shutdown of a computing device running the application not be in the position for sending an explicit release instruction, but may be simply terminated. If flows would only be released upon explicit release instructions, in such cases communication links or data flows may be maintained indefinitely.

Therefore, information that a data flow is no longer required, e.g. upon terminating a corresponding communication application, can also be conveyed by seizing to transmit periodic refresh requests. The refresh request preferably includes, similar to the release instruction, an indication of the data flow to be maintained and may also include the descriptors of the resources of the flow to be maintained such as the descriptors of the previous resource request issued for the flow. Including the descriptors of the to be maintained data flow into the refresh request enables maintaining the reservation counts updated, as will be outlined further below.

If in operation 302 the decision is "NO", indication that a refresh request within a certain predetermined time period or refresh period was not received, the data flow is released in operation 303, as described before.

Thereafter, in an operation 304 the reservation counts are updated based on the descriptors of the released flow. Releasing a data flow, if an explicit release instruction was received, includes the reverse process to including descriptors of a new flow into a reservation count, i.e. includes subtracting from the reservation counts all sum functions of the descriptors of the released data flow and dividing the reservation counts of all product functions by the product function of the descriptors of the released data flow. Accordingly, upon an explicit release instruction the reservation counts can be updated by removing from the aggregated counts the resources of the released flow based on the descriptors of the released flow.

If the data flow in operation 303 was released upon the absence of a refresh request within the required time period, the communication node may actively inquire on the descriptors of the flow, e.g. by interrogating the entity formally requesting admission of the data flow. Based on this interrogation the network node obtains the descriptors of the non-refreshed flow and can correspondingly remove the descriptors from the reservation counts as outlined before with regard to the explicitly released flow.

Accordingly, the reservation counts may always be kept up to date and reflect all flows continuously in use.

Figure 5:
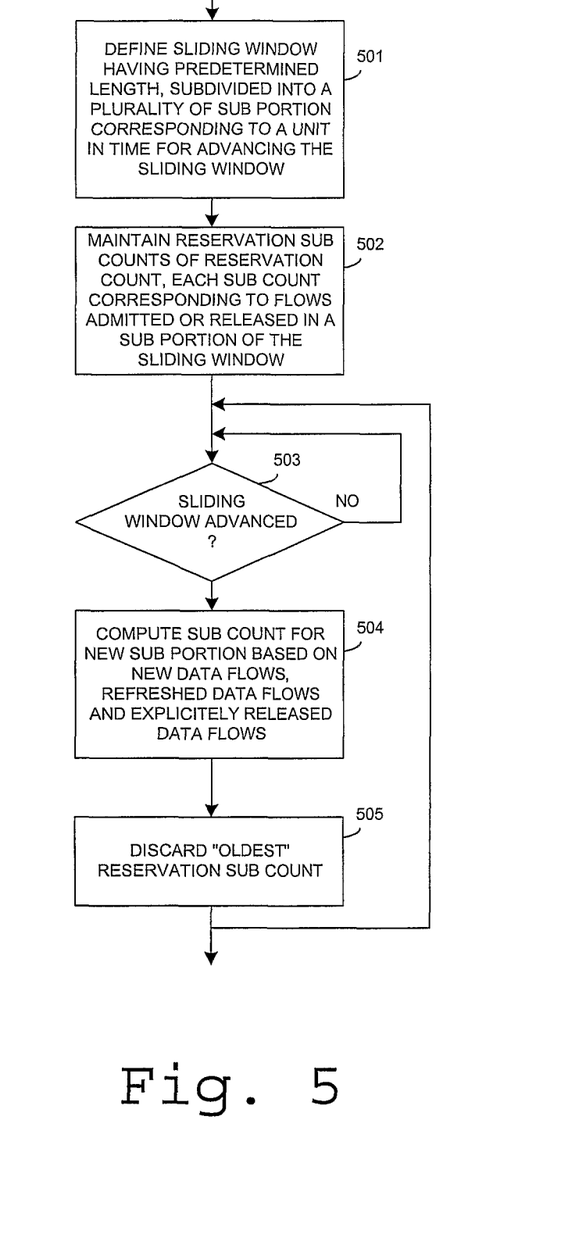
FIG. 5 illustrates operations of a method for resource reservation in a communication network according to another embodiment of the invention, particularly illustrating maintaining reservation sub-counts in connection with a sliding window algorithm.

If the communication node is unable to obtain the descriptors of the non-refreshed flow, a time based algorithm may be used that will be outlined in more detail with regard to FIG. 5. Briefly, this algorithm involves treating each refreshed flow as new flow that is admitted, i.e. the descriptors of each refreshed flow are included into the reservation counts. In order to avoid over-representing of descriptors and thus resources of refreshed flows in the reservation counts, as for each refresh the reservation counts are increased, the reservation counts are provided with time tags, allowing removal of expired portions or sub-counts of the reservation counts. A sub-count of the reservation count can e.g. be removed, if the time tag of the reservation sub-count is older than the refresh period, in which refresh requests have to be issued, as in this case all refreshed flows are considered anew in the counts and an oldest count already reflecting the refreshed flow should then be removed. All non-refreshed flows will not be represented anew in the newer reservation counts and will be removed with the oldest count.

Figure 4:
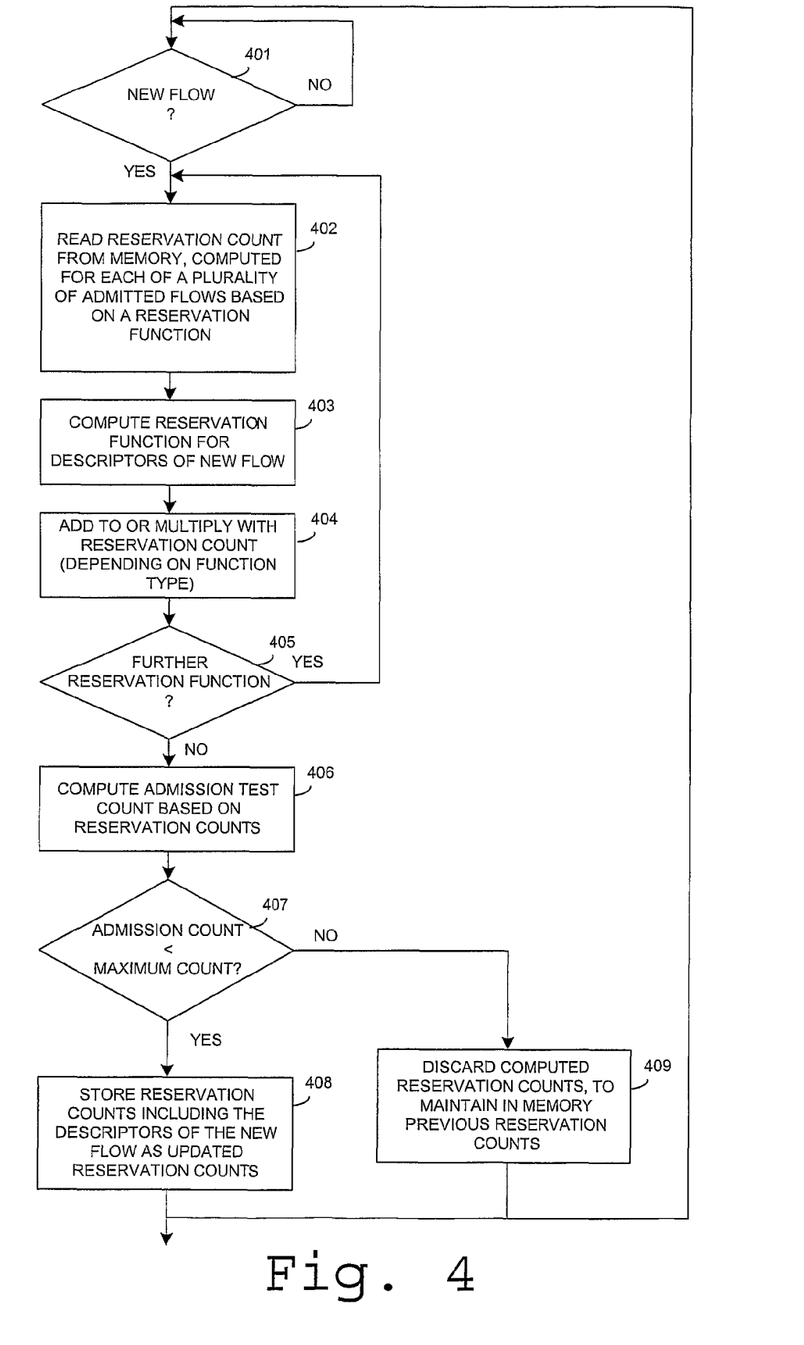
FIG. 4 illustrates operations of a method for resource reservation according to another embodiment of the invention, particularly illustrating updating reservation counts.

Following a further embodiment of the invention will be described with regard to FIG. 4. FIG. 4 illustrates operations of a method for resource reservation, particularly illustrating operations for computing an admission test count and updating reservation counts if flows are admitted.

In a first operation 401 is determined whether a new flow should be admitted, as outlined with regard to previous embodiments.

In an operation 402 a reservation count is retrieved from a memory, the reservation count being previously computed for each of a plurality of admitted flows based on a reservation function. As noted before, in case of a reservation sum function the reservation count is obtained by summarizing all sum functions of the descriptors of the already admitted flows.

If the reservation function is a product function, the reservation count is constituted by a product of all product functions of the descriptors of the already admitted flows.

Subsequently, in an operation 403, the reservation function is computed for the descriptors of the new flow requesting to be admitted.

Then, in an operation 404 the reservation count obtained with operation 402 and the result of operation 403 are combined depending on the function type. If the reservation function is a sum function, the result of operation 403 is added to the reservation count, and if the reservation function is a product function the result of operation 403 is multiplied with the reservation count obtained in operation 402. Then, in operation 405 it is determined whether a further reservation function is defined.

It is noted that the reservation functions can be arbitrary sum or product functions that may be predetermined or determined dynamically at need, e.g. by a network operator. Accordingly, the inventive framework for reserving resources and maintaining aggregated reservation states can be adapted to individual needs, by enabling definition of proprietary reservation functions.

If in operation 405 it is determined that a further reservation function is defined, operations 402-404 are repeated.

If in operation 405 it is determined that a further reservation is not determined, in an operation 406 an admission test count is computed based on the thus obtained reservation counts. Computing the admission test count may include any mathematical operations on the individual reservation counts, such as a weighted sum of the reservation counts, a weighted product of the reservation counts or any other operation.

Alternatively, according to another example, operation 404 is omitted and operation 406 includes the computation of the admission test count on the basis of the reservation counts and the computed reservation functions for the descriptors of the new flow from operation 403.

According to another example the reservation counts are maintained in a vector constituting the admission test count.

Then, in an operation 407 the thus obtained admission test count is compared to the maximum admission count. The maximum admission count, as outlined for example with regard to FIG. 2, may be constituted by a admission function of predefined maximum reservation counts corresponding to the reservation counts of the admission test count.

If the admission function, i.e., the maximum admission count is a single value, operation 407 is a simple comparison operation to determine whether the admission test count is smaller than the maximum admission count. If the admission test count and correspondingly the maximum admission count are represented by vectors of reservation counts, the individual elements of the vectors, such as the individual reservation counts and corresponding maximum reservation count are compared. In this case, according to an example, the admission test count is determined to be smaller than the maximum admission count, if all elements of the admission test vector are smaller than the corresponding maximum admission count.

If in operation 407 the decision is "YES", indicating that the admission test count is smaller than the maximum admission count, in an operation 408 the reservation counts including the descriptors of the new flow are stored at updated reservation counts. Accordingly, the now stored reservation counts reflect all admitted data flows, including the newly admitted data flow. Storing or updating the reservation counts may include overwriting corresponding previously stored reservation counts, stored prior to detecting a resource request for a new data flow.

If in operation 407 the decision is "NO", indicating that the admission test count is not smaller than the maximum admission count, in an operation 409 the computed reservation counts including the descriptors of the new flow are discarded, and the previously computed reservation counts are maintained, i.e., the reservation counts available before detecting the resource request for the new data flows.

Accordingly, the reservation counts always reflect the currently admitted data flows, or more precisely the resources required for the currently admitted flows.

In the following a further embodiment of the invention will be described with regard to FIG. 5. FIG. 5 illustrates operations of a method for resource reservation, particularly outlining steps for releasing data flows.

With regard to FIG. 3 an embodiment was described pertaining to a release of data flows and corresponding updating of the reservation counts. In operation 304 of FIG. 3 it was assumed that in case of not receiving a refresh request within a certain refresh time period, the descriptors of the non-refreshed flows are obtained to correspondingly update the reservation counts. However, in case such information is not available, i.e., if the descriptors of the non-refreshed flow cannot be obtained, a corresponding update operation cannot be carried out. As noted before, the reservation states are not maintained individually, i.e., the network node does not store the individual descriptors of the individual admitted flows, but only aggregated reservation counts are maintained.

The embodiment of FIG. 5 addresses the above problem of removing non-refreshed data flows from the reservation counts by using a sliding window technique.

As noted above, this involves treating each refreshed flow as new flow that is admitted, i.e. the descriptors of each refreshed flow are again included into the reservation counts. In order to avoid over-representing of descriptors and thus resources of refreshed flows in the reservation counts, as for each refresh the reservation counts are increased, the reservation counts are provided with time tags, and a sliding window is defined allowing removal of expired portions or sub-counts of the reservation counts. A sub-count of the reservation count can e.g. be removed, if the time tag of the reservation sub-count is older than the refresh period, in which refresh requests have to be issued, as in this case all refreshed flows are considered anew in the counts and an oldest sub-count already reflecting the refreshed flow should then be removed using the sliding window. All non-refreshed flows will not be represented anew in the newer reservation counts and will be removed with the oldest count.

Generally, the sliding window is used to calculate reservation counts for each reservation function in a certain time period based on all newly admitted flows and refreshed flows, and for discarding reservation counts when advancing the sliding window. Thus, reservation counts can be discarded after a certain time span, the refresh period for refreshing data flows as outlined before, as it is known that each non-refreshed flow after this time span can be released.

In a first operation 501 a sliding window having a predetermined length is defined, sub-divided into a plurality of sub-portions corresponding to a unit in time for advancing the sliding window. In other words, the sliding window is advanced by a sub-portion or unit upon lapse of a corresponding time period. Preferably, the sliding window has a predetermined length corresponding to the refresh period, in which refresh requests have to be issued by the application in order to avoid a release of the data flow.

In a operation 502 reservation sub-counts are maintained, each sub-count corresponding to data flows admitted or released in a sub-portion of the sliding window. Accordingly, each reservation count is constituted by a number of reservation sub-counts, the number of reservation sub-counts corresponding to the number of sub-portions of the sliding window.

In an operation 503 it is determined whether the sliding window is to be advanced, upon lapse of each unit in time for advancing the sliding window. If in operation 503 it is determined that the sliding window is advanced, in an operation 504 a new sub-count for a new sub-portion of the sliding window is computed for each reservation count, based on all dynamic changes of the resource reservation situation at the network node. The new reservation sub-count thus includes computing the reservation functions of the descriptors of all new data flows, the removal of resources of released data flows form the reservation counts and also includes reservation functions computed on descriptors of refreshed data flows. As noted with regard to FIG. 3 operation 302, a refresh request may include the descriptors of the correspondingly flow to be further maintained, and accordingly, the new reservation sub-count also represents resources of refreshed data flows. Accordingly, with the advancing of the sliding window new reservation sub-counts are computed, for reflecting resources in an aggregated manner for all newly admitted data flows, admitted according to the procedure described with regard to previous embodiments, refreshed data flows, and explicitly released data flows, as outlined before.

In order to avoid a double representation of resources for refreshed data flows in the reservation count, parallel to computing new reservation sub-counts for a new unit in time, the oldest reservation sub-counts are discarded. The oldest reservation sub-counts, i.e. the reservation count no longer forming part of the sliding window upon advancing the sliding window by one unit in time, represents all resources reserved for flows more than one refresh period or sliding window duration go. Any flows that have been refreshed during this period will be represented in one of the reservation sub-counts of the sliding window, and thus removing the oldest reservation sub-counts will effectively lead to a removal of reservation states from the reservation counts pertaining to all non-refreshed data flows.

Accordingly, even though the reservation states are maintained in an aggregated manner without explicit information on the descriptors of each flow, non-refreshed flows can be removed from the reservation counts.

The embodiments described above introduce a system that uses a general admission control formula framework in a sliding window technique. The embodiments described above provide efficient resource utilization for data flows by implementing reservation counts with aggregated variables. With the number of variables or reservation counts being independent on the number of flows the introduced technique is arbitrarily scalable.

According to another example, the network node is an IP (Internet Protocol) router that includes at least a resource manager and a flow control unit, such as outlined with regard to FIG. 1. The flow control unit may include an admission control unit implementing the above outlined admission control formulas expressed as multiple sum and product constructs of flow descriptors. Incoming resource requests may be processed in the resource manager and the admission control unit may perform the admission control decision. If the decision is positive the requested resources are added to the corresponding aggregated resources in the resource manager and the corresponding flow is admitted by the flow control unit. The above examples disclose the way to maintain flow descriptors, their functions, sum and product constructs in an aggregated manner to avoid storing flow descriptors of individual flows.

The invention is particularly applicable in streaming media applications posing strict requirements for the underlying transport network, as outlined before. Therefore, the task of deciding on the admission of a new flow has to avoid disrupting previously admitted flows. Considering for example the distributed knowledge principal of the Internet, without a centralized control, the admission decision preferably is made hop-by-hop, at each communication node, as disclosed above. Moreover, as the request for new flows may arrive at the communication nodes anywhere anytime, the decision has to be made on demand, based on the source request.

The above described embodiments are particularly useful for differentiated services networks, where network elements are categorized as edge and core nodes. Edge nodes are permitted to use per flow states, i.e., store descriptors pertaining to each flow admitted, while core nodes are only allowed to store aggregated variables, as described above with the reservation counts. Accordingly, the network node described with regard to the above embodiments may constitute a core node in a differentiated services network.

The descriptors of the flow to be admitted, like peak rate, mean rate, activity factor, etc. are signalled using a resource reservation signalling protocol available in the network.

With the reservation states handled as aggregated soft states, reservations not refreshed during a certain refresh period are automatically removed from the aggregated reservation states after lapse of a certain time period, as outlined with regard to FIG. 5.

The invention claimed is:

1. A method of reserving resources for data flows in a communication network, said method comprising the steps of:
    detecting a request for resource reservation for a new data flow including a plurality of descriptors specifying requested resources;
    computing an admission test count representing overall required resources when the new data flow is admitted, wherein the admission test count is computed based upon the plurality of descriptors of the new data flow and upon reservation counts, wherein each reservation count represents a collection of at least one sum function and at least one product function having as variables the plurality of descriptors of the admitted data flows;
    admitting the new data flow, when the admission test count is smaller than a maximum admission count representing a maximum bandwidth capability of the network; and
    updating the reservation counts to include the descriptors of the new data flow, when the new data flow is admitted.

2. The method as recited in claim 1, wherein the step of updating the reservation counts includes adding the at least one sum function of the descriptors of the new data flow to the reservation count and multiplying the reservation count with the at least one product function of the descriptors of the new data flow.

3. The method as recited in claim 2, wherein the plurality of descriptors are selected from a minimum bandwidth requirement, a mean bandwidth requirement, a maximum time delay for data transmission, a peak data rate, a mean data rate, and a quality of service requirement.

4. The method as recited in claim 3, further comprising the steps of:
receiving a release instruction for an identified admitted data flow;
releasing the identified admitted data flow; and
updating each reservation count to remove the corresponding descriptors of the released data flow.

5. The method as recited in claim 4, wherein the step of updating each reservation count to remove the corresponding descriptors of the released data flow includes subtracting the at least one sum function of the descriptors of the released data flow from the reservation counts and dividing the reservation counts by the at least one product function of the descriptors of the released data flow.

6. The method as recited in claim 1, wherein the step of computing each reservation count includes computing each reservation count based on data flows admitted or refreshed during a refresh window having a predetermined duration.

7. The method as recited in claim 6, further comprising releasing a data flow unless a refresh request associated with the data flow is received during the refresh window or if an explicit release instruction is received.

8. The method as recited in claim 6, wherein each reservation count comprises a plurality of sub-counts, each sub-count based on data flows admitted or refreshed during adjacent sub-portions of the refresh window, a sub-portion corresponding to a unit in time for advancing the refresh window.

9. The method as recited in claim 8, wherein upon advancing the refresh window by one unit in time, a new sub-count is generated and the oldest of the sub-counts is removed.

10. A network node for reserving resources for data flows in a communication network, said network node comprising:
at least one processor and a memory that stores computer program instructions, wherein when the at least one processor executes the computer program instructions, the at least one processor controls the following node components:
a resource manager configured to:
detect a request for resource reservation for a new data flow including a plurality of descriptors specifying requested resources; and
compute an admission test count representing overall required resources when the new data flow is admitted, wherein the admission test count is computed based upon the plurality of descriptors of the new data flow and upon reservation counts, wherein each reservation count represents a collection of at least one sum function and at least one product function having as variables the plurality of descriptors of the admitted data flows; and
a data flow control unit configured to admit the new data flow, when the admission test count is smaller than a maximum admission count representing a maximum bandwidth capability of the network;
wherein the resource manager is configured to update the admission test count to include the descriptors of the new data flow, when the new data flow is admitted.

11. The network node as recited in claim 10, wherein the resource manager is configured to update the admission test count by adding the at least one sum function of the descriptors of the new data flow to the reservation count and multiplying the reservation count with the at least one product function of the descriptors of the new data flow.

12. The network node as recited in claim 11, wherein the plurality of descriptors are selected from a minimum bandwidth requirement, a mean bandwidth requirement, a maximum time delay for data transmission, a peak data rate, a mean data rate, and a quality of service requirement.

13. The network node as recited in claim 12, wherein the resource manager:
receive a release instruction for an identified admitted data flow; and
update each reservation count, when a release instruction for one of the admitted data flows is received, based on the corresponding descriptors of the released data flow.

14. The network node as recited in claim 13, wherein the data flow control unit is configured to release a data flow by subtracting the at least one sum function of the descriptors of the released data flow from the reservation counts and dividing the reservation counts by the at least one product function of the descriptors of the released data flow.

15. The network node as recited in claim 10, wherein the resource manager is configured to compute each reservation count based on data flows admitted or refreshed during a refresh window having a predetermined duration.

16. The network node as recited in claim 15, wherein each reservation count comprises a plurality of sub-counts, each sub-count based on data flows admitted or refreshed during adjacent sub-portions of the refresh window, a sub-portion corresponding to a unit in time for advancing the refresh window.

17. The network node as recited in claim 15, wherein the resource manager is configured to release a data flow unless a refresh request associated with the data flow is received during the refresh window or when an explicit release instruction is received.

18. The network node as recited in claim 17, wherein the resource is configured to generate a new sub-count upon advancing the refresh window by one unit in time, and to discard the oldest of the sub-counts.

* * * * *

UNITED STATES PATENT AND TRADEMARK OFFICE
CERTIFICATE OF CORRECTION

| | | |
|---|---|---|
| PATENT NO. | : 9,094,349 B2 | Page 1 of 1 |
| APPLICATION NO. | : 14/082993 | |
| DATED | : July 28, 2015 | |
| INVENTOR(S) | : Császár et al. | |

It is certified that error appears in the above-identified patent and that said Letters Patent is hereby corrected as shown below:

In the Specification

In Column 1, Line 6, delete "of co-pending U.S." and insert -- of U.S. --, therefor.

In Column 1, Line 7, delete "2008," and insert -- 2008, now Pat. No. 8,681,624, --, therefor.

Signed and Sealed this
Twelfth Day of April, 2016

Michelle K. Lee
*Director of the United States Patent and Trademark Office*